United States Patent
Faher et al.

(10) Patent No.: US 12,452,062 B2
(45) Date of Patent: Oct. 21, 2025

(54) METHOD, USER DEVICE, SERVER, DEVICE AND SYSTEM FOR AUTHENTICATING A DEVICE

(71) Applicant: THALES DIS FRANCE SAS, Meudon (FR)

(72) Inventors: Mourad Faher, Marly le Roi (FR); Michael Webster, Vantaa (FI); Gérald Maunier, Sanary sur Mer (FR); Kamil Parizek, Prague-Kunratice (CZ)

(73) Assignee: THALES DIS FRANCE SAS, Meudon (FR)

( * ) Notice: Subject to any disclaimer, the term of this patent is extended or adjusted under 35 U.S.C. 154(b) by 115 days.

(21) Appl. No.: 18/014,802

(22) PCT Filed: Jul. 6, 2021

(86) PCT No.: PCT/EP2021/068615
§ 371 (c)(1),
(2) Date: Jan. 6, 2023

(87) PCT Pub. No.: WO2022/008491
PCT Pub. Date: Jan. 13, 2022

(65) Prior Publication Data
US 2024/0243914 A1    Jul. 18, 2024

(30) Foreign Application Priority Data
Jul. 9, 2020    (EP) ..................................... 20315346

(51) Int. Cl.
*H04L 9/32*    (2006.01)
*H04L 9/08*    (2006.01)

(52) U.S. Cl.
CPC ............ *H04L 9/321* (2013.01); *H04L 9/0869* (2013.01)

(58) Field of Classification Search
CPC ... H04L 9/321; H04L 9/0869; H04L 63/0807; H04L 9/32; G06F 21/44; G06F 2221/2129
See application file for complete search history.

(56) References Cited

U.S. PATENT DOCUMENTS 9,449,167 B2 *   9/2016  Varadharajan .......... G06F 21/31
9,490,974 B2 *  11/2016  Brown ................ H04L 63/0823
(Continued)

FOREIGN PATENT DOCUMENTS

EP          1965539 A1    9/2008

OTHER PUBLICATIONS

International Search Report (PCT/ISA/210) and Written Opinion (PCT/ISA/237) mailed on Sep. 24, 2021, by the European Patent Office as the International Searching Authority for current International Application No. PCT/EP2021/068615-[14 pages].

*Primary Examiner* — Quazi Farooqui

(57) ABSTRACT

A method for authenticating a device, comprising:
  sending, from a user device to a server, a data request;
  retrieving a predetermined encryption key;
  generating and at least a random and a cryptogram using the encryption key and the random;
  sending, to the or another user device, the cryptogram and the random, as a data request response;
  extracting, from the data request response, the random and storing, at least in a temporary manner, the reference random;
  sending, to at least the device, the cryptogram;
  decrypting the cryptogram using a predetermined decryption key and obtaining a random;
  sending, to the user device, the random;
  verifying whether the received random matches or not the reference random; and
(Continued)

authenticating, only if yes, the device.

10 Claims, 1 Drawing Sheet

(56) References Cited

U.S. PATENT DOCUMENTS

| | | |
|---|---|---|
| 11,228,602 B2 * | 1/2022 | Gangi .................... H04L 67/12 |
| 2005/0001589 A1 | 1/2005 | Edington et al. |
| 2006/0156415 A1 | 7/2006 | Rubinstein et al. |
| 2015/0006887 A1 * | 1/2015 | Brand .................... G06F 21/33 |
| | | 713/156 |

* cited by examiner

METHOD, USER DEVICE, SERVER, DEVICE AND SYSTEM FOR AUTHENTICATING A DEVICE

FIELD

The invention relates generally to a method for authenticating a device.

Furthermore, the invention also pertains to a user device for authenticating a device.

Moreover, the invention also relates to a device for authenticating to a user device.

The invention concerns a server for authenticating a device.

The invention also pertains to a system for authenticating a device. The system includes one or several user devices, at least the device and one or several servers.

BACKGROUND

US 2001/054147 A1 describes a solution that allows a device to authenticate a user device. The user device stores a private key relating to the user device. The device is provisioned with a public key relating to the user device. The device encrypts a RaNDom (or RND) using the public key and sends to the user device the encrypted RND. Then, the user device decrypts the encrypted RND using the private key. The user device returns to the device the resulting RND. If the received RND is the generated RND, then the device authenticates the user device.

However, such a user device authentication scheme implies providing each device that may have to authenticate a user device with a public key relating to the concerned user device which is heavy to deploy and maintain over time on all the possible user devices.

There is a need of a solution that allows authenticating a device and that is simpler and more lightweight to deploy at the user device than with such a known solution.

SUMMARY

The invention proposes a solution for satisfying the just herein above specified need by providing a method for authenticating a device.

According to the invention, the method comprises:
a) sending, from a user device, directly or indirectly, to a server, a data request;
b) retrieving, by or through the server, based on the data request, a predetermined encryption key;
c) generating, by or through the server, at least a random and a cryptogram using the encryption key and at least the random;
d) sending, from or through the server, directly or indirectly, to the or another user device, the cryptogram and at least the random, as a data request response;
e) extracting, by or through the user device, from the data request response, at least the random and storing, by or through the user device, at least in a temporary manner, at least the random, as a reference random;
f) sending, from or through the user device to at least the device, a request, as a cryptogram decryption request, for decrypting a cryptogram including or being accompanied with the cryptogram;
g) decrypting, by or through the device, the cryptogram using a predetermined decryption key and obtaining, by or through the device, at least a random;
h) sending, from or through the device to the user device, at least the random, as a cryptogram decryption request response;
i) verifying, by or through the user device, at least whether the received random does or does not match the reference random; and
j) authenticating, by or through the user device, only if the received random matches the reference random, the device.

The principle of the invention consists in transmitting, from a user device, directly or through (an)other device(s), such as a Personal Computer (or PC), to a server, a request for getting data, as a data request. At the server side, further to a retrieval of a predefined encryption key thanks to the data request, at least a random is enciphered or encrypted using the encryption key. The server transmits, directly or through (an)other device(s), to the (or another) user device, a resulting cryptogram and at least the random, as a response to the data request. At the user device side, the random is extracted from the data request response and registered at least temporarily as a reference random. The user device then transmits, to at least the device, the cryptogram. The device or a cooperating entity deciphers or decrypts the received cryptogram using a predefined decryption key. The device gets and transmits, to the user device, at least a resulting random. The user device (or a cooperating entity) checks whether the received (resulting) random matches (or not) the (registered) reference random. Only in the affirmative case, thanks to a possible cooperating entity, the user device authenticates successfully the device.

It is to be noted that the random is either pre-generated or generated on-the-fly at the server side, i.e. once a data request is received from a user device.

The user device gets, from the device, the expected random, namely the random registered at the user device side, only if the device is genuine, i.e. the device or a possible cooperating entity is able to decrypt the cryptogram using the decryption key.

It is noticeable that the user device receives, from or through the server, preferably via a first communication channel, at least the random and the cryptogram and sends, to at least the device and possibly (an)other device(s), the cryptogram preferably via a second communication channel. The second communication channel is distinct from the first communication channel.

The cryptogram to be received, by the user device, from the server, plays a role of a correlation with at least the associated random that is to be provided, by or through the device, to the user device, and that is to be checked by or through the user device.

It is to be noticed that the user device used for verifying a random only stores (or lets its possible cooperating entity store), at least in a temporary manner, at least a reference random to be issued by or through the server. The memory footprint is therefore limited, minimum and efficient at the user device side.

The invention solution allows ensuring that the device is genuine prior to disclosing any data, from or through the user device, to the device side.

The invention solution is simple at a user device side, since the user device (or a possible cooperating entity) has only to register merely at least a reference random to be issued from the server side and compare at least a random to be received from the device side to the registered reference random.

The user device (or its cooperating entity) does not need to know any cryptographic key to authenticate the device as the user device (or its cooperating entity) processes at least a reference random to be received from the server side and at least a random to be received from the device side and compares the lastly received random to the reference random.

Contrary to the aforementioned prior art solution, the user device (or its cooperating entity), as an authenticating device, does not need to access a public key relating to the device, as a device to be authenticated. As a matter of fact, the user device (or its cooperating entity) deals only with a cryptogram and at least a random used for generating the cryptogram and a random resulting from a decryption operation and originating from the device side. The invention user device does not need any secure means, like e.g., a Secure Element (or SE) or a Hardware Security Module (or HSM), to carry out a cryptographic operation(s). The invention user device is simple and easy to implement since no cryptographic key is to be set and maintain at the user device side to authenticate (or not) a device.

The invention solution is simple and efficient at the user device side, as the user device (or its cooperating entity) registers only at least temporarily a reference random to be matched by a random to be provided from the device side.

The invention method user device therefore keeps user privacy since the user device (or its cooperating entity) does not provide to a device to be authenticated, besides a cryptogram, any data prior to a device authentication success.

The device (or its cooperating entity) has to carry out an on-the-fly decryption of a cryptogram received from the user device, as an original requester, and a delivery, to the requester or its holder, of a random that results from the cryptogram decryption at the device side.

The invention solution is secure at the device side, as the device or its cooperating entity, such as an SE or an HSM, registers a decryption key and decrypts a cryptogram to be received from an original requester and provides the user device and/or its holder with a corresponding decryption result, namely at least a random.

The invention solution is also secure at the device side, as the device (or its cooperating entity) keeps secret the decryption key by not needing to transmit any cryptographic key or associated key to the user device.

The decryption key may include a symmetric key shared between the device and (an)other entity(ies), such as the server and/or (an)other entity(ies) connected hereto, or a private key relating to the device, as an asymmetric key.

The invention solution is secure at the user device side as well, since the user device (or its cooperating entity) does not need to know any cryptographic key and process only at least an associated random which does not reveal any secret or sensitive data.

According to an additional aspect, the invention is a user device for authenticating a device.

According to the invention, the user device is configured to:
  receive, directly or indirectly, from or through a server, a cryptogram and at least a random, as a data request response;
  extract, from the data request response, at least the random;
  store, at least in a temporary manner, at least the random, as a reference random;
  send, to at least the device, a request, as a cryptogram decryption request, for decrypting a cryptogram including or being accompanied with the cryptogram;
  receive, from or through the device, at least a random, as a cryptogram decryption request response;
  verify at least whether the received random does or does not match the reference random; and
  authenticate, only if the received random matches the reference random, the device.

The user device includes, e.g., a mobile (tele)phone, a tablet, a portable PC and/or any other computing type device.

According to a further additional aspect, the invention is a server for authenticating a device.

According to the invention, the server is configured to:
  receive, from a user device, directly or indirectly, a data request;
  retrieve, based on the data request, a predetermined encryption key;
  generate at least a random and a cryptogram using the encryption key and at least the random; and
  send, directly or indirectly, to the user device or another user device, the cryptogram and at least the random, as a data request response.

According to still an additional aspect, the invention is a device for authenticating to a user device.

According to the invention, the device is configured to:
  receive, from the user device, a request, as a cryptogram decryption request, for decrypting a cryptogram including or being accompanied with a cryptogram;
  decrypt the cryptogram using a predetermined decryption key and obtaining at least a random; and
  send, to the user device, at least the random, as a cryptogram decryption request response.

The device includes, e.g., a reader, a terminal and/or any other computing type device.

Instead of a standalone device, the device may also cooperate locally with an SE, an HSM or a remote server, as a (device) cooperating entity. The device thus cooperates with the cooperating entity that carries out at least in part the above defined operations carried out by the device for authenticating to the user device. The SE is incorporated within or coupled to the device, as an SE host device.

Within the present description, an SE is a smart object that includes a chip(s) that protect(s), as a tamper resistant component(s), access to stored and/or processed data and that is(are) intended to communicate data with an external device(s), like e.g., an SE host device, such as a terminal.

According to still an additional aspect, the invention is a system for authenticating to a device. The system includes at least one user device, at least the device and at least one server.

According to the invention, the system is adapted to carry out the steps of the aforementioned method.

BRIEF DESCRIPTION OF THE DRAWINGS

Additional features and advantages of the invention will be apparent from a detailed description of a preferred embodiment of the invention, given as an indicative and non-limitative example, in conjunction with the following drawings.

DETAILED DESCRIPTION

Herein under is considered a case in which the invention method for authenticating a device is implemented by, at a user side, a phone, as a standalone user device, a server and a reader, as a standalone device. The user device does not need to cooperate locally, i.e. at the user device location, with another entity, like e.g., an SE, so as to perform the functions that are described infra and that are carried out by the phone.

According to another embodiment (not represented), the invention method for authenticating a device is implemented by a reader in cooperation with a local SE, an HSM or a server, as a cooperating entity. According to such an embodiment, the cooperating entity is adapted to perform, in a more secure fashion, the functions that are described infra and that are carried out by the reader.

The invention does not impose any constraint as to a kind of the SE type.

The SE may include an incorporated chip, like e.g., a Trusted Executed Environment (or TEE), or a chip that is communicatively coupled to the device, as an SE host device, and included in a smart card (or another medium). The SE may be fixed to or removable from its host device. As removable SE, it may include a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device.

Naturally, the herein below described embodiment is only for exemplifying purposes and is not considered to reduce the scope of the invention.

Figure 1:
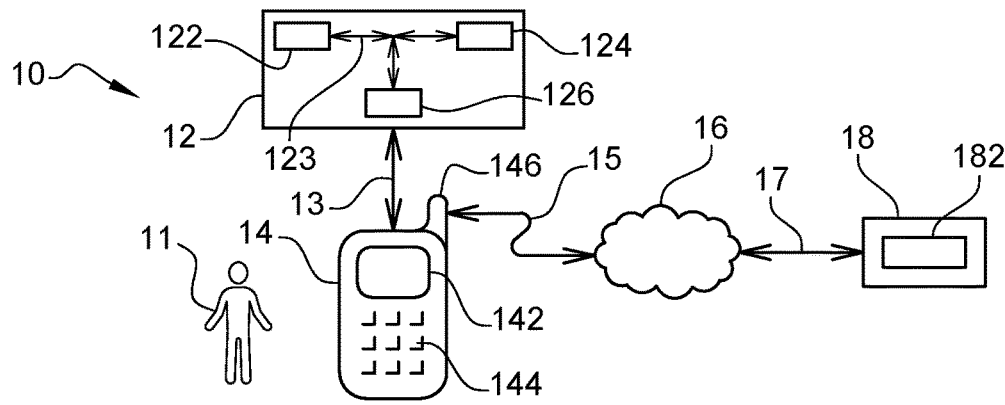
FIG. 1 is a simplified diagram of an embodiment of a system including a phone, a (remote) server and a reader, the phone being adapted to get, after a request, from the server side, a cryptogram and at least a reference RND and provide the reader with the cryptogram, the server being arranged to retrieve, based on the request, a predefined encryption key, generate and send, directly or indirectly, to the phone, the cryptogram and at least the reference RND, the reader being arranged to receive, decrypt the cryptogram, and send, to the phone, at least a resulting RND, the phone (and/or its holder) being further adapted to check at least whether the lastly received RND is the reference RND.

FIG. 1 shows schematically a system 10 for authenticating e.g., a reader 12.

The system 10 includes at least the reader 12, as a device, e.g., a phone 14, as a device used by a user 11, and a ServeR (or SR) 18.

The device 12 may allow accessing a location(s), a premise(s), a product(s) and/or a service(s), such as a restaurant, a club, a bar, an entertainment, a rental car office, a vending machine, a reserved conference room, a hotel, a shop and/or any other location(s)/product(s)/service. The device 12 may be (physically) located at a place where a user(s) may request access to the location(s), the premise(s), the product(s) and/or the service(s).

The device 12 is intended to communicate with one or several user devices, such as the phone 14, when the phone 14 is sufficiently close to the device 12.

The device 12 may include or be locally coupled to an SE (not represented) or be remotely connected to an SR (not represented), as a (reader) cooperating entity.

Instead of a reader, the device 12 includes a terminal, a PC and/or any (electronic) type device. The device 12 includes any computing device including means for processing data, including or being connected to communication means for exchanging data with outside, and including or being connected to means for storing data.

The reader 12 includes one or several (hardware) (micro) processors (one or several (micro)controllers and/or a Central Processing Unit (or CPU)), as data processing means 122, including and/or being connected to one or several memories, as data storing means 124, and including or being connected to Input/Output (or I/O) interfaces 126 that are internally all connected, through an internal bidirectional data bus 125.

The I/O interfaces 126 include a wired and/or a contactless interface(s), to exchange, over a ContacT (or CT) and/or ContacT-Less (or CTL) type link(s) 13, with the phone 14, as a local entity, and/or (an)other entity(ies) (not represented), as a local or remote entity(ies).

Within the present description, the adjective "CTL" denotes notably that involved communication means communicates using one or several Short Range (or SR) type RadioFrequency (or RF) links.

The SR type RF link(s) may be related to any CTL technology that allows the reader 12 to exchange locally data, through a CTL type link(s), with any local entity.

The CTL type link(s) 13 may include a BluetooTH (or BTH), a Bluetooth Low Energy (or BLE), a Wi-Fi, a ZigBee, a Near Field Communication (or NFC) type link(s) and/or any other SR type RF communication technology link(s).

Alternatively, instead of a CTL type link(s), or additionally, the reader 12 is connected, through a wire(s) or a cable(s), as a CT link, to any local entity, such as the user device.

The reader memory(ies) may include one or several volatile memories and/or one or several non-volatile memories.

The reader memory(ies) 124 store(s) an Operating System (or OS).

The reader memory(ies) 124 (or a (reader) cooperating entity, such as a local SE or a remote SR) store(s) preferably an invention application (or SoftWare (or SW)), i.e. a code or data that is executable by a or the reader (or cooperating entity) (micro)processor (or (micro)controller or CPU).

The reader (or a cooperating entity, such as a local SE, an HSM or a remote SR) memory(ies) 124 register(s) or store(s) a predetermined decryption key and a predetermined decryption algorithm, like e.g. a Data Encryption Standard (or DES) or 3DES type algorithm.

The decryption key is, in a first scenario, a private key (or pk) relating to the reader 12, or, in a second scenario, a symmetric key (or sk) shared between the reader 12 and (an)other entity(ies), such as the SR 18, another SR and/or an HSM (not represented), that may have generated the decryption key.

In the first scenario, the reader 12 or another entity that is communicatively connected to the device is preferably arranged to generate a key pair that includes the pk, as the decryption key and a corresponding Public Key (or PK) relating to the device, as the associated encryption key. The generated key pair, namely the pk and the PK, relates to the reader 12.

The decryption key is associated with either, in the first scenario, the reader 12 or, in the second scenario, the reader 12 and (an)other entity(ies) that cooperate(s) preferably with the SR 18.

The decryption key is used for decrypting a cryptogram to be received by the reader 12 during a device authentication session.

The reader 12 is arranged to receive, from a user device, a request, as a cryptogram decryption request, for decrypting a cryptogram including or being accompanied with a cryptogram.

According to an essential invention feature, the reader 12 (or a cooperating entity, such as a local SE or a remote SR) is adapted to decrypt the (received) cryptogram using the (stored) decryption key.

The reader 12 (or a cooperating entity) is configured, further to the cryptogram decryption, to obtain at least a RaNDom (or RND), as a decryption result.

The reader 12 may also be configured, further to the cryptogram decryption, to obtain an RND and executable data, as a cryptogram decryption result. The RND and executable data that both result from the cryptogram decryption operation constitute a concatenate.

Within the present description, a concatenate is a series or chain of different data elements, with or without a separator between the different data elements.

The reader 12 is preferably further adapted to execute the (resulting) executable data that results from the cryptogram decryption operation.

The reader 12 is arranged to send, to the (requesting) user device, at least the RND, as at least a part of the decryption operation result and a cryptogram decryption request response.

The RND is used for authenticating the reader 12 by or through the user device, such as the phone 14.

The phone 14 is preferably situated at a location where the reader 12 to be authenticated is also present and that allows the phone 14 and the reader 12 to communicate.

The phone 14 includes one or several (hardware) (micro) processors (one or several (micro)controllers and/or a CPU), as data processing means (not represented), including and/or being connected to one or several memories, as data storing means (not represented), and including or being connected to I/O interfaces (not represented) that are internally all connected, through an internal bidirectional data bus.

The phone I/O interfaces include preferably (or are connected to) means, such as a Man Machine Interface (or MMI), for interfacing with the user 11.

The phone 14 MMI may include a display screen(s) 142, a physical (and/or virtual) keyboard(s) 144, a loudspeaker(s) (not represented) and/or a camera(s) (not represented).

The phone 14 MMI may include one or several biometric sensors, so as to capture one or several user biometric features or data.

The phone 14 MMI allows the user 11 to interact with the phone 14.

The phone 14 MMI may be used for getting data entered and/or provided by the user 11, such as user authentication data. The user authentication data may include a Personal Identification Number (or PIN) and/or user biometric data. The user biometric data includes e.g., a user fingerprint(s), a user palm print(s), a facial user image(s), a user picture(s), a user iris print(s) and/or (an)other biometric user feature(s)).

The phone 14 MMI may be used for providing data, such as one or several RND numbers or RNDs that is(are) to be received from the SR 18 side and/or that is(are) to be received from the reader 12 side. The thus provided data may include a result of an execution of executable data that is(are) to be received from the SR 18 side and that corresponds to the result of an execution, at the device side, of the concerned executable data. The provided data allows presenting, among others, orally and/or visually, the concerned data to the user 11.

The phone I/O interfaces include preferably a wired and/or a CTL interface(s), to exchange, over a CT and/or CTL type link(s) 13, with the reader 12, as a local entity. The phone I/O interfaces include preferably a wireless interface (s), to exchange, over a wireless type link(s) 15, through one or several communication networks 16, with the SR 18 and/or (an)other SR(s) connected hereto, as a remote entity (ies).

The communication networks 16 may include one or several mobile radio-communication networks, an Intranet network and/or an Internet network.

Within the present description, the adjective "wireless" denotes notably that involved communication means communicates using one or several Long Range (or LR) type RF links.

The LR type RF link(s) may be related to any wireless technology that allows the phone 14 to exchange remotely data, through the wireless type link(s) 15, with any remote entity.

The phone memory(ies) may include one or several volatile memories and/or one or several non-volatile memories.

The phone memory(ies) may store a first and/or a last name(s) relating to the user 11, as a user IDentifier(s) (or ID), an International Mobile Equipment Identity (or IMEI), an International Mobile Subscriber Identity (or IMSI), a Mobile Subscriber Integrated Services Digital Network number (or MSISDN), an Internet Protocol (or IP) address, a Media Access Control (or MAC) address, an email address (es) and/or the like, as an ID(s).

The phone memory(ies) may store data, such as an ID(s) relating to the phone 14, that allows identifying uniquely and addressing the phone 14. The phone 14 ID(s) may include a unique ID1, such as a UUID1, a Uniform Resource Locator (or URL) 1, a Uniform Resource ID (or URI) 1 and/or other data that allows identifying uniquely and addressing the phone 14.

The phone memory(ies) store(s) an OS.

The phone memory(ies) (or a (phone) cooperating entity, such as a local SE or a remote SR) store(s) preferably an invention application (or SW), i.e. a code or data that is executable by a or the phone (or cooperating entity) processor (or controller or CPU).

The phone memory(ies) may store data, such as an ID(s) relating to the SR 18, that allows identifying uniquely and addressing the SR 18.

The phone 14 may be provided by the user 11 with the SR 18 ID(s). The SR 18 ID(s) may include a unique ID2, such as a UUID2, a URL2, a URI2, and/or other data that allows identifying uniquely and addressing the SR 18.

The phone 14, as a user device, or a PC (not represented) (and more exactly a supported Web type application or browser), as another user device that is preferably used by the user 11, may be configured to send, to the SR 18, a data request.

Such a data request sending allows launching a session of authentication of the device 12 to be authenticated.

According to the embodiment including the PC, as another user device, to request data to the SR 18, the user 11 may enter, through the PC MMI, e.g., an MSISDN, an IMSI and/or other data, as an ID(s) relating to the phone 14. The phone 14

The data request may include a URL 1, a URI 1 and/or other data, as one or several IDs relating to the PC, or an MSISDN, an IMSI and/or the like, as one or several IDs relating to the phone 14, as the user device(s) which has (have) to be involved to authenticate the reader 12.

The data request may include a URL 2, a URI 2 and/or other data that allows identifying uniquely and addressing the SR 18 one or several IDs relating to the SR 18, as the SR which has to be involved to authenticate the reader 12.

The phone 14 is arranged to receive, directly or indirectly, i.e. through another user device, such as a PC (browser), from or through the SR 18, a cryptogram and at least an RND, as a response to the data request (that has been sent to the SR 18 side).

The phone 14 may be arranged to receive, directly or indirectly, i.e. through another user device, from the SR 18 side, besides a cryptogram and an RND, a result of an execution of executable data, as a data request response.

The phone 14 may be able to verify that the data request response has been previously signed at the SR 18 side, as its genuine sender.

The phone 14 is configured, possibly after a successful signature verification, to extract, from the data request response, at least the RND.

The phone 14 may be configured, possibly after a successful signature verification, to extract, from the data request response, besides the RND, the result of an execution of executable data, when received from the SR 18 side.

The phone 14 is arranged to store, at least in a temporary manner, the RND, as a reference RND, and possibly a result of an execution of executable data, as a reference execution result. The reference RND is expected to be provided from the device 12 side. The stored RND is a reference RND to be matched. The phone 14 authenticates the reader 12 or authorizes continuing the reader 12 authentication session only if the RND received from the reader 12 side matches the RND received from the SR 18 side.

The phone 14 is adapted to send, to at least the reader 12, as the device to be authenticated, and possibly (an)other device(s) that is(are) locally situated, a request, as a cryptogram decryption request, for decrypting a cryptogram that includes or is accompanied with the cryptogram that has been received from the SR 18 side.

The phone 14 is configured to receive, from or through the reader 12, at least an RND, as at least a part of the cryptogram decryption result and a cryptogram decryption request response.

The phone 14 may be configured to receive, from or through the reader 12, besides an RND, other data that may be received through (an)other channel(s), such as e.g., an Infra-Red (or IR) channel, distinct from the channel through which the phone 14 has received the RND.

According to an essential invention feature, the phone 14 (or a cooperating entity, such as an SE) is adapted to verify at least whether the RND that is received from the reader 12 side does or does not match the reference RND that is received from the SR 18 side.

If the lastly received RND does not match the reference RND, i.e. is not valid, then the phone 14 (or a cooperating entity, such as an SE) fails to authenticate the concerned reader 12.

Otherwise, i.e. if the lastly received RND matches the reference RND, the phone 14 (or a cooperating entity, such as an SE) authenticates at least in part (when the executable data execution result is also to be valid, i.e. matching the reference executable data execution result) successfully the concerned reader 12 that has been involved only through the phone 14 for its authentication to the phone 14.

Alternatively or additionally, the user 11 verifies at least whether the RND that is received from the reader 12 side does or does not match the reference RND that is received from the SR 18 side.

Additionally, the phone 14 (or a cooperating entity, such as an SE) may be adapted to verify whether at least a first part of an execution, by or through the reader 12, of executable data does or does not match at least a first part of the reference execution result that is received from the SR 18 side.

Alternatively or additionally, the user 11 verifies whether at least a second part of an execution, by or through the reader 12, of executable data does or does not match at least a second part of the reference execution result that is received from the SR 18 side. The second part of the reference execution result is a complementary part of the first part of the reference execution result, so that the first and second parts of the reference execution result corresponds to the whole reference execution result.

The phone 14 (a cooperating entity, such as an SE, and/or the user 11) is adapted to authenticate the reader 12, only if the RND received from or through the reader 12 matches the reference RND and possibly if the execution, by or through the reader 12, of the resulting executable data matches the reference execution result.

The SR 18 is preferably not involved to address directly the device to be authenticated, during a device authentication session.

The SR 18 is accessible through the communication network(s) 16, over a (bi-directional) wireless and/or wire links 17, from at least a set of user devices.

The SR 18 may be accessible, through the communication network(s) 16 or (an)other communication network(s), from at least a set of devices to be authenticated.

The SR 18 is identified by an ID(s) relating to the SR 18. The SR 18 ID(s) may be stored at the user device side (e.g., in a PC memory, a phone 14 memory and/or a memory of a cooperating entity, such as an SE, that is communicatively coupled to the phone 14).

The SR 18 may be operated by an authority, a Mobile Network Operator (or MNO), a Mobile Virtual Network Operator (or MVNO), a bank operator, a service provider or on its behalf.

The SR 18 is hosted by a computer device(s) including, each, data processing means, like e.g., a controller(s), a CPU and/or a processor(s) (not represented), and several I/O interfaces for exchanging data with outside.

The SR 18 accesses a database that includes a set of one or several IDs relating, each, to a device to be authenticated, such as e.g., the reader 12. The device ID set is predefined. Each device ID allows identifying uniquely a corresponding device. The device ID set includes, preferably for each device or for at least a subset of device(s), at least an encryption key and possibly other data, such as an RND, possibly predetermined executable data and possibly a result of an execution of the executable data. The encryption key is used for encrypting data, such as an RND and possibly predetermined executable data. A predefined data encryption algorithm, like e.g. a DES or 3DES type algorithm, may be associated with the concerned device 12 ID(s) and the encryption key and may be used for encrypting the concerned data.

The SR 18 includes or is communicatively connected or coupled to an SR memory(ies) 182, as data storing means.

The database may be stored in the SR memory(ies) 182, a memory(ies) of another server communicatively connected to the SR 18, a memory(ies) of a cloud communicatively connected to the SR 18 and/or a blockchain.

The SR 18 or another cooperating entity, such as another SR, that is communicatively connected to the SR 18, as an RND generation entity, is preferably configured to generate an RND during a device pre-authentication phase or on-the-fly during a device authentication session.

The SR memory(ies) 182 store(s) an OS.

The SR memory(ies) 182 store(s) preferably an invention application (or SW), i.e. a code or data that is executable by a or the SR (or cooperating entity) controller, CPU or processor.

The SR 18 is configured to receive, directly, from a user device, such as the phone 14, or indirectly, i.e. through another user device, like e.g., a PC, a data request.

Such a data request includes one or several pieces of information that allow(s), the SR 18 or through the SR 18, to identify at least the device 12 to be authenticated.

The piece(s) of information include(s):
- one or several identifiers relating to the device 12;
- one or several identifiers relating to the user device, such as a PC or the phone 14, that is used for sending the data request to the SR 18;
- one or several identifiers relating to the user device, such as a PC or the phone 14, that is used for receiving the data request response from or through the SR 18;
- one or several geographical positions, such as one or several Global Positioning System (or GPS) positions and/or one or several Location Area Identities (or LAI), relating to the user device, like e.g., the phone 14, or another user device, such as a PC;
- one or several identifiers, such as a Quick Response (or QR) code(s), relating to a service which the user device requests, through the data request, to access to; and/or
- one or several identifiers, like e.g., an IMSI, an MSISDN and/or a user account, relating to the user.

The SR 18 (or a cooperating entity that is connected hereto, such as an HSM or another SR) is arranged to retrieve, based on the received data request, a predetermined encryption key.

The SR 18 (or a cooperating entity that is connected hereto, such as an HSM or another SR) is adapted to generate at least an RND prior to any device authentication session, i.e during a phase that is prior to a device authentication session, or on-the-fly during each newly launched device authentication session. The RND is preferably a nonce, i.e. that is valid only once. Such a nonce allows protecting against one or several replay-attacks.

The SR 18 (or a cooperating entity that is connected hereto, such as an HSM or another SR) may be configured to generate executable data either prior to any device authentication session or on-the-fly during each newly launched device authentication session. The executable data is preferably valid only once, so as to allow protecting against one or several replay-attacks.

According to an essential invention feature, the SR 18 (or a cooperating entity that is connected hereto, such as an HSM or another SR), as a cryptogram generation entity, is adapted to generate, preferably on-the-fly, a cryptogram using at least the RND and the (retrieved) encryption key.

The cryptogram is a cipher relating to at least the RND.

Such a cryptogram generation is used for authenticating at least a device to be authenticated during a device authentication session.

To generate the cryptogram, the cryptogram generation entity enciphers or encrypts at least a (pre-generated) RND using the encryption key.

Alternatively, to generate the cryptogram, the cryptogram generation entity:
- concatenates a (pre-generated) RND and predetermined executable data; and
- encrypts the RND concatenated with the executable data, using the encryption key.

The (resulting) cryptogram is a concatenate of an encrypted RND and encrypted executable data.

The SR 18 (or a cooperating entity that is connected hereto, such as an HSM or another SR) may be configured to generate the encryption key, i.e. in the first scenario, a corresponding Public Key (or PK) relating to a (sub)set of device(s) or the device, or, in the second scenario, the sk.

The SR 18 (or a cooperating entity that is connected hereto, such as an HSM or another SR) may be configured to generate a private key, as a signature generation key, that relates to the SR 18. The signature generation key allows signing data, such as a cryptogram and at least a (pre-generated) RND and possibly a result of an execution of executable data, to be sent to an identified user device.

The SR 18 (or a cooperating entity that is connected hereto, such as an HSM or another SR) may be configured to generate a public key, as a signature verification key, that is associated with the signature generation key that also relates to the SR 18. The signature verification key allows an SR interlocutor(s), such as the user device, to verify data that has been received from and signed by the SR 18.

The SR 18 (or a cooperating entity that is connected hereto, such as an HSM or another SR) is arranged to send, directly or indirectly, i.e. through e.g., a PC, as another user device, to the user device, such as the phone 14, the cryptogram and at least the RND, as a data request response.

Alternatively, the SR 18 (or a cooperating entity that is connected hereto, such as an HSM or another SR) is arranged to send, directly or indirectly, i.e. through e.g., a PC, to the user device, such as the phone 14, the cryptogram, the RND and a result of an execution (at the device to be authenticated, i.e. the device to be authenticated or an entity(ies) cooperating herewith) of the executable data, as a data request response.

The SR 18 plays preferably a role of an authority that is in charge of providing, during a device authentication phase or session, a verifier device side, such as the phone 14 side, with a cryptogram accompanied with at least an associated RND.

Figure 2:
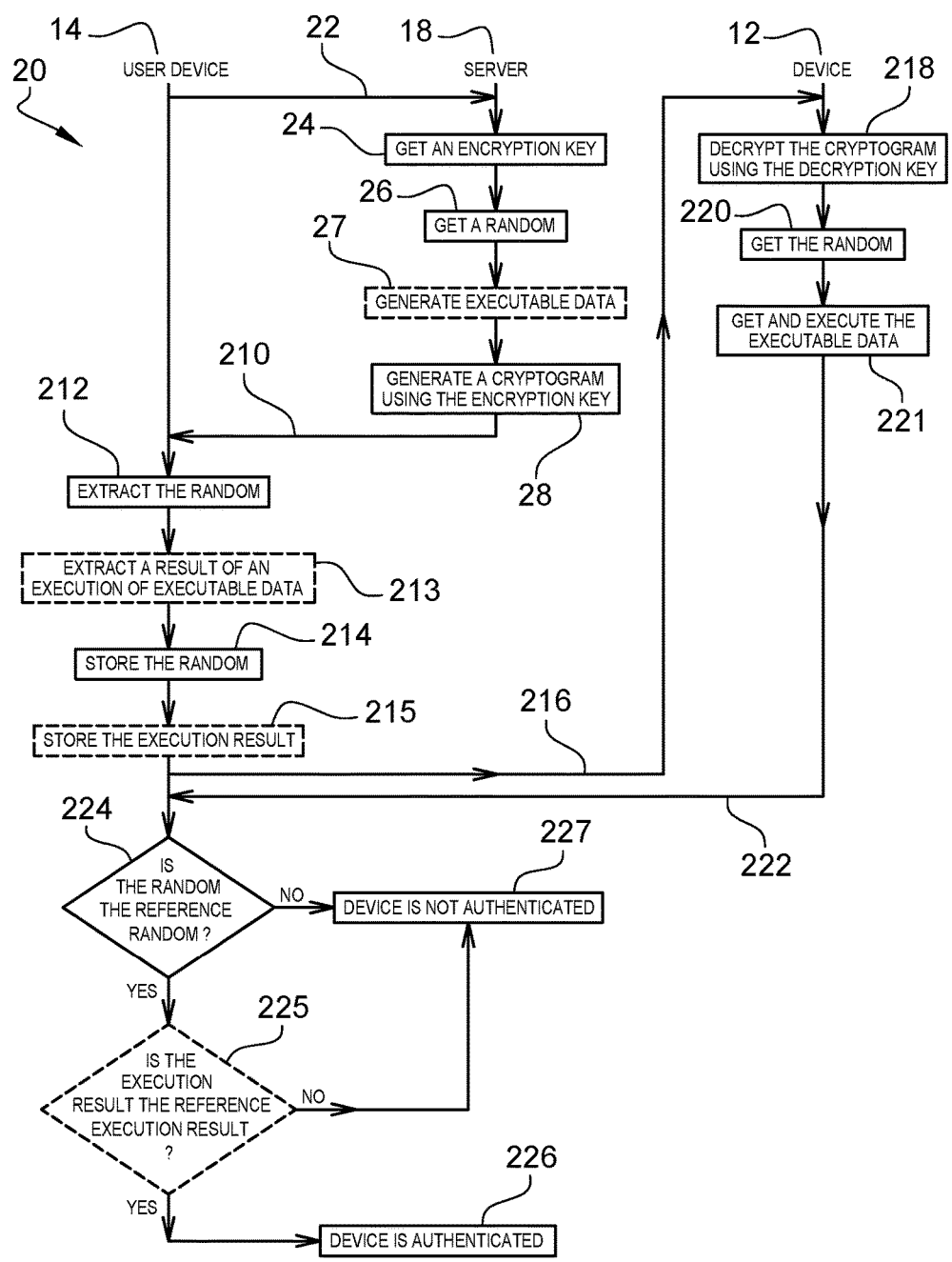
FIG. 2 is a message flow between the phone, the server and the reader of FIG. 1, so that, once the reader has provided the phone (and/or its holder) with at least the RND resulting from the cryptogram decryption, the phone (and/or its holder) ensures that at least the provided RND is (or is not) the reference RND.

FIG. 2 depicts an embodiment through a message flow 20 that involves at least the user device 14, such as e.g., the phone 14, the SR 18 and the device 12 to be authenticated, such as e.g., the reader 12.

In the described example, it is assumed that the SR 18 accesses a database that includes a pre-generated encryption key in association with a predetermined reader 12 ID(s). The encryption key has been previously generated preferably at the SR 18 side or at the device 12 side.

It is further assumed that, once configured, the device 12 (or a cooperating entity that is communicatively connected or coupled to the device 12) stores preferably securely a pre-generated decryption key. The decryption key has been previously generated preferably at the SR 18 side or at the device 12 side.

It is still further assumed that a (device 12 authentication) session is launched automatically or at a user 11 initiative.

To launch at the user initiative such a session, the user 11 uses e.g., the phone 14, and initiates an execution of an invention application that is supported by the phone 14.

Alternatively, instead of using the phone 14, the user 11 uses a PC (not represented), as another user device. The user 11 initiates an execution of a Web type application or browser that is supported by the PC, so as to connect to e.g., a portal that allows accessing a targeted service(s). The user 11 enters, through e.g., a page downloaded from the SR 18, e.g., an IMSI and/or an MSISDN relating to the phone 14, as one or several IDs relating to the user device which a corresponding response is to be sent to.

The phone 14 (or the PC) sends, preferably via an Over-The-Air (OTA), Over-The-Internet (or OTI), Over-The-Cloud (or OTC) or a Wireless Local Area Network (or WLAN) channel, as a first channel, a request 22 for getting data, as a data request.

The SR 18 (or a cooperating entity, such as an HSM or another SR (not represented) (communicatively) connected hereto) retrieves 24, based on the (received) data request, a predetermined encryption key.

The SR 18 (or a cooperating entity, such as another SR connected hereto) generates 26 preferably on-the-fly (i.e. once the SR 18 has received a data request) an RND.

Alternatively, the SR 18 (or a cooperating entity, such as another SR connected hereto), gets a pre-generated RND.

Optionally, the SR 18 (or a cooperating entity, such as another SR connected hereto), generates 27 a set of one or several instructions, as executable data, or gets predetermined executable data. The used executable data is preferably personalized according to the device 12 to be authenticated and in particular its functional capacities, such as e.g., a function of emitting, directly or indirectly, a reference light(s), a reference sound(s) and/or a reference music(s), a function of transmitting a message(s), a function of displaying, directly or indirectly, a reference picture(s), such as an icon or a sign, a reference image(s) and/or a reference video(s).

Then, the SR 18 (or a cooperating entity, such as another SR connected hereto), generates 28 a cryptogram using at least the RND and the (retrieved) encryption key. The cryptogram constitutes a cipher relating to at least the RND.

Alternatively, i.e. instead of encrypting only the RND to generate a corresponding cryptogram, the SR 18 (or a cooperating entity, such as another SR connected hereto) concatenates the RND and the executable data and encrypts the RND concatenated with the executable data using the (retrieved) encryption key.

Once the cryptogram is generated, the SR 18 (or a cooperating entity, such as another SR connected hereto) sends, preferably via the first channel, directly or indirectly, i.e. through a PC, as another user device, to the phone 14, the cryptogram and at least the RND, as a data request response 210.

Alternatively, i.e. instead of sending only the cryptogram and the RND, the SR 18 (or a cooperating entity, such as another SR connected hereto) sends, directly or indirectly, i.e. through a PC, as another user device, to the phone 14, the cryptogram, the RND and a result of an execution of the executable data, as a data request response.

Optionally, prior to sending the data request response, the SR 18 (or a cooperating entity, such as another SR connected hereto) converts the data request response in a particular data format(s), such as e.g., a QR code, a 2Dimension (or 2D) bar code, a 3Dimension (or 3D) bar code and/or the like. Such a data format conversion allows the phone 14, as a future interlocutor of the device to be authenticated, to capture the data request response provided by or through the SR 18. The phone 14 is thus able to forward, to the device 12, the cryptogram included in the data request response.

Optionally, the SR 18 (or a cooperating entity, such as an HSM or another SR connected hereto) signs (not represented) the data request response. The data request response includes the cryptogram, the RND and possibly a result of an execution of the executable data by or through the device 12.

After a possible data format conversion, the phone 14 (or a cooperating entity that is communicatively connected or coupled hereto) thus acquires preferably out-of-band the data request response issued from the SR 18 side.

The phone 14 (or a cooperating entity that is communicatively connected or coupled hereto) extracts 212, from the (received) data request response, at least the RND.

Optionally, the phone 14 (or a cooperating entity that is communicatively connected or coupled hereto) further extracts 213, from the (received) data request response, the execution result.

Prior to extracting, from the data request response, the RND and possibly a result of an execution of the executable data by or through the device 12, the phone 14 verifies (not represented) successfully that the cryptogram and at least the RND have been signed at the SR 18 side. The data request response signature allows proving that the data request response issuer is the SR 18.

The phone 14 may present visually and/or orally a part or the whole (extracted) data, such as the RND and/or at least a part of the execution result, as reference data. The presented reference data allows informing the user 11 and possibly involving her/him for a comparison of:
  an RND to be received from the device 12 to be authenticated to the reference RND received from the SR 18 side; and/or
  an execution result to be received/perceived from the device 12 to be authenticated to at least the part of the reference execution result received from the SR 18 side.

Then, the phone 14 (or a cooperating entity that is communicatively connected or coupled hereto) records or stores 214 preferably, at least in a temporary manner, the (received) RND, as a reference RND.

Optionally, the phone 14 (or a cooperating entity that is communicatively connected or coupled hereto) records or stores 215, at least in a temporary manner, the (received) execution result, as a reference execution result.

The reference execution result, such as sending to the phone 14 a message including a device authentication result, such as e.g., "OK" or the like meaning that the device 12 has succeeded in decrypting the cryptogram, as a first part of the reference execution result that may be complemented by e.g., an emitting of a green Light-Emitting Diode(s) (or LED) light(s) possibly in an intermittent manner, as a second part of the reference execution result, is the result of an execution, at the device side, of the executable data (after a successful cryptogram decryption).

The phone 14 sends, preferably via e.g., a CTL channel, as a second channel, to at least the device 12 (to be authenticated), a request for decrypting the cryptogram that includes or is accompanied with the cryptogram 216. The device 12 may be unknown and/or situated in an untrusted environment, such as a public place.

Besides the device 12, (an)other device(s) that may be also present in a vicinity of the phone 14 and that is(are) in the CTL field also receive(s) the cryptogram but such other device(s) is(are) not able to decrypt the cryptogram as the other device(s) do(es) not own the right decryption key to be used for decrypting successfully the cryptogram. The second channel is preferably separate from the first channel.

Then, the device 12 (or a cooperating entity, such as an SE, an HSM or another SR, that is communicatively connected or coupled hereto) deciphers or decrypts 218 the (received) cryptogram using the decryption key.

The device 12 (or the cooperating entity) obtains 220 at least an RND. The (obtained) RND results from the cryptogram decryption operation.

Optionally, the device 12 (or the cooperating entity) also obtains 221, besides the RND, executable data. The (obtained) executable data also results from the cryptogram decryption operation. The device 12 then executes 221 the (resulting) executable data. The device 12 (and/or a cooperating entity(ies)) may, (by) executing the executable data:
- send (or let a connected and cooperating entity(ies) send), possibly via a third channel(s) distinct from the first channel, to one or several entities, such as the user device 14, the SR 18, (an)other user device(s) and/or (an)other SR(s), one or several messages;
- emit (or let a connected and cooperating entity(ies) emit) one or several lights, such as a LED(s);
- emit (or let a connected and cooperating entity(ies) emit) one or several sounds;
- emit (or let a connected and cooperating entity(ies) emit) one or several music;
- display one or several images;
- let, by or through the (requesting) user device, display one or several images;
- display one or several pictures;
- let, by or through the (requesting) user device, display one or several pictures;
- display one or several videos; and
- let, by or through the (requesting) user device, display one or several videos.

The result of an execution of the executable data, as an execution result, by or under control of the device 12 is preferably to be received by or through the phone 14 and/or perceived by its user 11. The execution result may include one or several signals that are emitted by or under control of the device 12 and that may be sensed by the phone 14 or its user 11. Such an emitted signal(s) may include one or several audible and/or visual signals.

The device 12 (or the cooperating entity) sends, to the phone 14, at least the RND 222, as a cryptogram (decryption request) response.

The phone 14 may present visually and/or orally a part or the whole (received) cryptogram response, such as the RND and possibly at least a part of the execution result. The presented part or whole cryptogram response allows informing the user 11 and possibly involving her/him for a comparison of the RND received from the device 12 to be authenticated to the reference RND received from the SR 18 side and/or for a comparison of an execution result to be received and/or perceived from the device 12 side to at least a part of the reference execution result received from the SR 18 side.

Then, the phone 14 (or a cooperating entity that is communicatively connected or coupled hereto) verifies 224 preferably at least whether the RND received from the device 12 side does or does not match the reference RND.

Alternatively, instead of the phone 14 or its cooperating entity, the user 11 verifies preferably at least whether the RND received from the device 12 side does or does not match the reference RND.

If the RND received from the device 12 side does not match the reference RND, then the phone 14, its cooperating entity or the user 11 (i.e. or through the phone 14) does not authenticate 227 the device 12.

Otherwise, i.e. only if the RND received from the device 12 side matches the reference RND, the phone 14, its cooperating entity or the user 11 (i.e. or through the phone 14) authenticates 226 the device 12 or continues authenticating the device 12.

Alternatively, instead of verifying only the validity of the RND, the phone 14, its cooperating entity and/or the user 11 further verify(ies) 225 whether an execution, by and/or through from the device 12, of the executable data does or does not match the (stored and/or presented) reference execution result. In other words, the phone 14 side detects whether a result of an execution of the executable data by or under control of the device 12 does or does not equal the reference execution result.

If the RND received from the device 12 side does not match the reference RND and/or if the execution, by and/or through from the device 12, of the executable data does not match the (stored and/or presented) reference execution result, then the phone 14, its cooperating entity or the user 11 (i.e. or through the phone 14) does not authenticate 227 the device 12.

Otherwise, i.e. only if the RND received from the device 12 side matches the reference RND and if the execution, by and/or through the device 12, of the executable data matches the reference execution result, the phone 14, its cooperating entity or the user 11 (i.e. or through the phone 14) authenticates 226 successfully the device 12.

Only a genuine device 12 (or its cooperating entity) that registers the right decryption key is thus able to decrypt a cryptogram, return a resulting RND and, when applicable, execute resulting executable data.

In a successful device authentication scenario, the phone 14, its cooperating entity and/or the user 11 (i.e. or through the phone 14) is(are) ensured that the device 12, as a secret holder, owns the right decryption key.

Once the phone 14 side is ascertained that the device 12, as its interlocutor, is not a fake device, a fraudulent device and/or the like, the phone 14 side may exchange with the device 12 to access a service(s) provided by or through the device 12. The phone 14 side may then provide the device 12 with data, such as user credentials.

The invention allows authenticating out-of-band, simply, securely, efficiently and cheaply, a device to a user device (and/or its user), as the user device interlocutor.

The invention allows authenticating the device to the user device without needing to disclose any personal user data to the device prior to its successful authentication.

The invention may be automatically implemented, i.e. without involving the user of the user device except for moving sufficiently towards the device, so that the user device is able to exchange data with the targeted device. Such an invention implementation is transparent to the user and therefore user friendly.

The user device (and/or its user) has(have) preferably therefore no knowledge of data, and in particular any device cryptographic key, relating to the device to be authenticated during the device authentication.

The invention is therefore simple to set up and deploy.

The invention is notably applicable to a mobile Driving License (or mDL) or a mobile IDentity (or mID).

The invention claimed is:

1. A method for authenticating a device, comprising:
   a) sending, from a user device, directly or indirectly, to a server, a data request;
   b) retrieving, by or through the server, based on the data request, a predetermined encryption key;
   c) generating, by or through the server, at least a random and a cryptogram using the encryption key and at least the random;

d) sending, from or through the server, directly or indirectly, to the or another user device, the cryptogram and at least the random, as a data request response;

e) extracting, by or through the user device, from the data request response, at least the random and storing, by or through the user device, at least in a temporary manner, at least the random, as a reference random;

f) sending, from or through the user device to at least the device, a request, as a cryptogram decryption request, for decrypting a cryptogram including or being accompanied with the cryptogram;

g) decrypting, by or through the device, the cryptogram using a predetermined decryption key and obtaining, by or through the device, at least a random;

h) sending, from or through the device to the user device, at least the random, as a cryptogram decryption request response;

i) verifying, by or through the user device, at least whether the received random does or does not match the reference random; and j) authenticating, by or through the user device, only if the received random matches the reference random, the device.

2. The method according to claim 1, wherein the method comprises respectively, instead of the steps c), d), e), g), i) and j), the following steps:

c') of generating the cryptogram consists in:
  concatenating, by or through the server, the random and predetermined executable data; and
  encrypting, by or through the server, the random concatenated with the executable data using the encryption key;

d') of sending the data request response consists in sending, from or through the server, directly or indirectly, to the user device, the cryptogram, the random and a result, as an execution result, of an execution of the executable data, as a data request response;

e') of extracting, by or through the user device, from the data request response, the random and the execution result and storing, by or through the user device, at least in a temporary manner, the random, as a reference random, and the execution result, as a reference execution result;

g') of decrypting, by or through the device, the cryptogram using a predetermined decryption key, obtaining, by or through the device, a random and executable data and executing, by or through the device, the resulting executable data;

i') of verifying, by or through the user device, whether the received random does or does not match the reference random and whether an execution, by or through the device, of the resulting executable data does or does not match the reference execution result; and j') of authenticating, by or through the user device, only if the received random matches the reference random and if the execution, by or through the device, of the resulting executable data matches the reference execution result, the device.

3. The method according to claim 2, wherein the reference execution result includes at one element of a group including:
  an emission of at least one reference light;
  an emission of at least one reference sound;
  an emission of at least one reference music;
  a transmission, to at least one entity, of at least one message;
  a display, by or through the device, of at least one reference image;
  a display, by or through the user device, of at least one reference image;
  a display, by or through the device, of at least one reference picture;
  a display, by or through the user device, of at least one reference picture;
  a display, by or through the device, of at least one reference video; and
  a display, by or through the user device, of at least one reference video.

4. The method according to claim 1, wherein the device cooperates with a cooperating entity, and the cooperating entity replaces the device to carry out at least one of the steps carried out by or through the device.

5. The method according to claim 2, wherein, prior to the step of sending, from or through the server, directly or indirectly, to the user device, the cryptogram, the random and the result of an execution of the executable data, the method further comprises:
  signing, by or through the server, the cryptogram, the random and the result of an execution of the executable data; and
  prior to the step e) of extracting, by or through the user device, from the data request response, the random and the result of an execution of the executable data;
  verifying, by or through the user device, successfully that the cryptogram, the random and the result of an execution of the executable data are signed at the server side.

6. The method according to claim 1, wherein, once the user device has received, from or through the server, directly or indirectly, the data request response and/or once the user device has received, from or through the device, at least the random, as a cryptogram decryption request response, the method further comprises a step of presenting, by or through the user device, visually and/or orally the reference random and/or the random resulting from the cryptogram decryption.

7. The method according to claim 1, wherein, prior to the step of sending, directly or indirectly, to the user device, the cryptogram and at least the random, as the data request response, the method further comprises:
  signing, by or through the server, the cryptogram and at least the random; and
  prior to the step e) of extracting, by or through the user device, from the data request response, at least the random;
  verifying, by or through the user device, successfully that the cryptogram and at least the random are signed at the server side.

8. The method according to claim 1, wherein the data request includes at least one piece of information allowing, by or through the server, to identify at least the device.

9. The method according to claim 8, wherein the at least one piece of information includes at least one element of a group including:
  at least one identifier relating to the device;
  at least one identifier relating to the user device that is used for sending the data request to the server;
  at least one identifier relating to the user device that is used for receiving the data request response from or through the server;
  at least one geographical position relating to the or another user device;

at least one identifier relating to a service which the user device requests, through the data request, to access to; and at least one identifier relating to the user.

10. A user device for authenticating a device, wherein the user device is configured to:

receive, directly or indirectly, from or through a server, a cryptogram and at least a random, as a data request response;

extract, from the data request response, at least the random;

store, at least in a temporary manner, at least the random, as a reference random;

send, to at least the device, a request, as a cryptogram decryption request, for decrypting a cryptogram including or being accompanied with the cryptogram;

receive, from or through the device, at least a random, as a cryptogram decryption request response;

verify at least whether the received random does or does not match the reference random; and authenticate, only if the received random matches the reference random, the device.

\* \* \* \* \*